Patented Dec. 11, 1923.

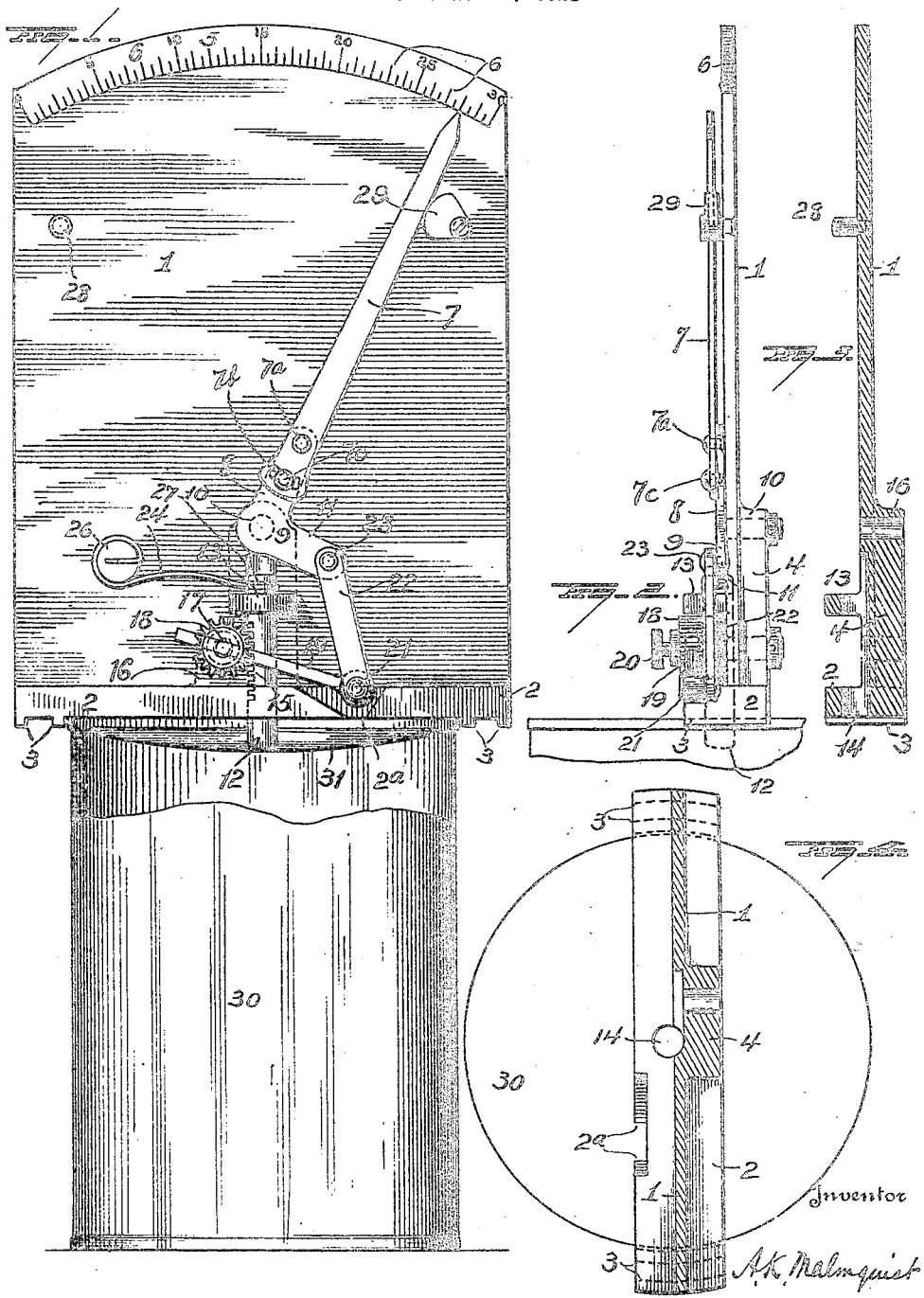

1,476,904

UNITED STATES PATENT OFFICE.

ADOLPH K. MALMQUIST, OF SOUTH BELLINGHAM, WASHINGTON, ASSIGNOR TO DEMING & GOULD COMPANY, OF SOUTH BELLINGHAM, WASHINGTON.

TESTING INSTRUMENT.

Application filed January 22, 1921. Serial No. 439,172.

*To all whom it may concern:*

Be it known that I, ADOLPH K. MALMQUIST, a citizen of the United States, and a resident of South Bellingham, in the county of Whatcom and State of Washington, have invented certain new and useful Improvements in Testing Instruments; and I do hereby declare the following to be a full, clear, and exact description of the invention, such as will enable others skilled in the art to which it appertains to make and use the same.

This invention relates to improvements in testing instruments and more particularly to an improved instrument for determining the degree of vacuum in sealed food containers, one object of the invention being to provide a simple instrument for accurately indicating the degree of vacuum in a sealed container having a sheet metal closure, without necessity for puncturing the closure or any other part of the container and without necessity for use of a pump.

With this and other objects in view, the invention consists in certain novel features of construction and combinations of parts as hereinafter set forth and pointed out in the claims.

In the accompanying drawings; Figure 1 is a view in elevation showing my improvements and the application of the same to an exhausted can, the latter being shown in section; Figure 2 is an edge view; Figure 3 is a vertical sectional view of the frame of the device and Figure 4 is a transverse sectional view of said frame.

In the art of canning food, it is the practice to exhaust the air from the tin cans or the jars and to tightly seal the cans or jars containing the food in vacuum, with closures such as sheet metal. It is a matter of importance that a predetermined degree of vacuum (according to the particular character of food which is canned) shall be obtained and this degree of vacuum maintained after the can shall have been sealed,—otherwise deterioration of the food might occur by reason of the presence of an excessive amount of air within the can and this would cause the setting up of chemical reactions in the can which would be detrimental to both the food and the can. The purpose of my invention is to provide means whereby the degree of vacuum within a sealed can may be accurately determined without puncturing the can and thereby admitting air thereto.

It is well known that the sheet metal closures used on receptacles containing food in vacuum, are more or less flexible and that the external atmospheric pressure causes such flexible closure to become depressed or bent inwardly so that its outer face will be concave. The degree of concavity of the closure will depend upon the degree of vacuum within the receptacle and I take advantage of this fact to measure and accurately determine the degree of vacuum within the can with the use of the instrument hereinafter described, applied to the end of the receptacle (either end if the receptacle is a tin can), and the practice heretofore employed of puncturing the can for the application of a device of the pressure gage variety, will be avoided.

My improved testing instrument comprises a frame or plate 1 (preferably of aluminum) provided at its lower end with lateral flanges forming a comparatively broad base 2 having near its respective ends, a plurality of curved ribs 3 whereby the instrument may be accurately placed upon different sized cans.

The frame plate 1 may be made near its bottom, with an enlarged or thickened portion 4 which serves to support the movable parts of the instrument. The frame plate is provided at or near its upper end with a scale 5 which is graduated to represent inches of vacuum from zero to thirty,—the spaces 6 between each two graduations representing five inches of vacuum being subdivided into one-half inch graduations.

A pointer 7 is provided to register with the scale 5 and this pointer is adjustably connected at its lower end to the upwardly projecting arm 8 of a bell-crank-lever 9, the latter being pivotally mounted as at 10 near the upper end of the portion 4 of the frame plate, and the other arm 11 of the bell-crank projects laterally from said pivotal mounting.

The portion 4 of the frame plate is recessed for the accommodation of a vertically-movable plunger 12,—the frame plate being provided with a perforated lug 13 and the base 2 being provided with a hole 14 to guide said plunger. The plunger 12 is provided with rack teeth as indicated at 15, and the enlarged portion of the frame plate provides a bearing 16 for a shaft 17 carrying a pinion 18 which meshes with said rack teeth. A rod or arm 19 passes through a hole in the pinion 18 and projects beyond the periphery thereof, said rod or arm being adjustably secured to the pinion by a thumb screw 20. One end of the rod or arm 19 is pivotally connected, as at 21 with one end of a link 22, the other end of said link being pivoted, as at 23 with the arm 11 of the bell-crank-lever 9. The base 2 of the frame may be notched as at 2ª to accommodate the connected ends of the rod 19 and link 22.

A spring 24 is secured at one end to a lug 26 fast on the frame plate and at its other end enters a notch or recess 27 in the plunger 12,—said spring normally acting to press the plunger downwardly.

Stops 28 and 29 are provided on the frame plate 1 to limit the extreme movements of the pointer, and the stop 29 may be made in the form of an adjustable cam whereby the limit of movement of the pointer in one direction may be adjusted.

The proper adjustment of the instrument may be determined by the application of the instrument to the end of a master can which has been exhausted to a predetermined high degree,—depending upon the atmospheric or barometric pressure prevailing at the time. Assuming that this pressure is twenty-eight inches, and that the degree of vacuum in the can 30 is twenty-eight inches, the closure 31 will be bowed or depressed inwardly to the extent shown in Figure 1 and the pointer will register twenty-eight inches on the scale 5. Should the barometric pressure be less than twenty-eight inches, the degree of curvature would be less than that shown in Figure 1 and the extreme throw of the pointer would be reduced and caused to indicate the actual degree of vacuum which exists in the can. By reason of the varying degrees of atmospheric pressure, the instrument should be adjusted at least once each day. Such adjustment may be readily and accurately effected by adjusting the stop 29; by adjusting the pointer relatively to the bell-crank-lever, and by adjusting the rod 19 relatively to the pinion 18, said last-mentioned adjustment causing corresponding movement of the bell-crank and pointer. In order that adjustment of the pointer 7 may be readily effected, said pointer may be pivoted at 7ª to the arm of the bell-crank and provided with an elongated slot 7ᵇ for the accommodation of a set screw 7ᶜ.

In using the instrument to test an exhausted can or other receptacle having a flexible closure, to determine the degree therein, the instrument will be placed on the end of the can so that the plunger 12 will engage the center of the closure. If the degree of vacuum in the can is less than that for which the instrument may be set, the plunger will be caused, by engagement with the can closure, to move upwardly and its rack connection with the pinion 18 will cause the latter to be turned and transmit motion, through the rod 19, link 22 and bell-crank 9 to the pointer, so that the latter will be moved backwardly from its extreme-throw position to an intermediate position on the scale and thus indicate the exact degree of vacuum in the can, and denote to the operator whether the can is leaky or whether there is in the can a proper predetermined degree of vacuum necessary to insure the preservation of the food in the can.

Should a can closure be flat, the plunger will be moved far enough to move the pointer to zero on the scale and thus indicate that there is no degree of vacuum in the can.

Various slight changes might be made in the details of construction of my invention without departing from the spirit thereof or limiting its scope and hence I do not wish to restrict myself to the precise details herein set forth.

Having fully described my invention what I claim as new and desire to secure by Letters Patent, is:—

1. Testing means, comprising a frame constructed at one end to engage diametrically opposite portions of the end of a food receptacle, a scale having graduations denoting inches of vacuum, a movable member carried by said frame to engage a closure on the food receptacle, a pointer, and means co-operable with said movable member and pointer, whereby the degree of vacuum in the receptacle may be determined by the extent of inward curvature and indicated by the pointer on the scale.

2. A testing instrument for determining the degree of vacuum in a food receptacle having a flexible closure, comprising a frame to engage the end of the receptacle at diametrically opposite points, a scale having graduations denoting inches of vacuum, a movable pointer, a movable member to engage the closure of the receptacle, and means for transmitting motion from said movable member to the pointer.

3. A testing instrument of the character described, comprising a frame provided with a scale, a pointer mounted on the frame to register with said scale, a spring-pressed plunger, a rod, rack-and-pinion gearing between said plunger and rod, and connections between said rod and pointer, whereby movement of the latter is effected when the plunger is moved.

4. A testing instrument of the character described, comprising a frame provided with a scale, a pointer to register with said scale, a pivotal support for said pointer, a spring-pressed plunger having rack teeth, a pinion mounted on the frame to mesh with said rack teeth, a rod carried by said pinion, an arm projecting laterally from the pivotal support of the pointer and a link connecting said arm and rod.

5. A testing instrument of the character described, comprising a frame constructed at one end to span the end of a can and engage the same at diametrically opposite points, said frame provided with a scale graduated in inches of vacuum, a bell-crank mounted on said frame, a pointer adjustably connected with one arm of the bell-crank, a spring-pressed plunger to engage the closure of the can, connections between said plunger and the other arm of the bell-crank.

6. A testing instrument of the character described, comprising a frame constructed at one end to span the end of a can and engage the same at diametrically opposite points, said frame provided with a scale graduated to represent inches of vacuum, a pointer mounted on the frame to register with said scale, stops for limiting the extreme movements of the pointer, one of said stops being adjustable, a spring-pressed movable member to engage the can closure, and connections between said movable member and the pointer for effecting movements of the latter relatively to the scale.

7. A testing instrument of the character described, comprising a frame for application to a food container, said frame provided with a scale, a pointer mounted on said frame to register with said scale, a spring-pressed plunger for engaging the closure of a food receptacle, said plunger having rack teeth, a pinion meshing with said rack teeth, a rod carried by said pinion, means for adjustably securing said rod to the pinion, and connections between said rod and the pointer to effect movement of the latter when the plunger and pinion are moved.

8. A testing instrument of the character described, comprising a frame having a base portion provided with a plurality of spaced curved ribs near respective ends, whereby said frame is adaptable to food receptacles of different sizes, a scale on said frame, a spring-pressed plunger carried by said frame and adapted to engage a receptacle closure, a pointer mounted on the frame to register with said scale, and connections between the plunger and said pointer for effecting movement of the latter when the plunger is moved.

In testimony whereof, I have signed this specification in the presence of two subscribing witnesses.

ADOLPH K. MALMQUIST.

Witnesses:
W. S. HODGE,
G. F. DOWNING.